United States Patent
Hofmann et al.

(10) Patent No.: US 6,323,375 B1
(45) Date of Patent: Nov. 27, 2001

(54) CRYSTALLINE DOUBLE METAL CYANIDE CATALYSTS FOR PRODUCING POLYETHER POLYOLS

(75) Inventors: Jörg Hofmann, Krefeld; Pramod Gupta, Bedburg; Robert-Joseph Kumpf, Düsseldorf; Pieter Ooms, Krefeld; Walter Schäfer, Leichlingen; Michael Schneider, Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/509,979

(22) PCT Filed: Oct. 5, 1998

(86) PCT No.: PCT/EP98/06312

§ 371 Date: Apr. 5, 2000

§ 102(e) Date: Apr. 5, 2000

(87) PCT Pub. No.: WO99/19063

PCT Pub. Date: Apr. 22, 1999

(30) Foreign Application Priority Data

| Oct. 13, 1997 | (DE) | 197 45 120 |
| Dec. 23, 1997 | (DE) | 197 57 574 |
| Mar. 10, 1998 | (DE) | 198 10 269 |
| Jul. 31, 1998 | (DE) | 198 34 573 |
| Sep. 16, 1998 | (DE) | 198 42 382 |

(51) Int. Cl.$^7$ .................. C07C 43/11; B01J 31/02
(52) U.S. Cl. .......... 568/613; 568/618; 568/620; 568/623; 568/624; 568/625; 502/152; 502/159; 502/162; 502/167; 502/175
(58) Field of Search ............... 568/613, 618, 568/620, 623, 624, 625; 502/152, 159, 162, 167, 175

(56) References Cited

U.S. PATENT DOCUMENTS

| 3,404,109 | 10/1968 | Milgrom | 260/611 |
| 3,829,505 | 8/1974 | Johnston | 260/611 B |
| 3,941,849 | 3/1976 | Herold | 260/607 A |
| 5,158,922 | 10/1992 | Hinney et al. | 502/175 |
| 5,627,120 | 5/1997 | Le-Khac | 502/156 |
| 5,639,705 | 6/1997 | Bowman et al. | 502/175 |
| 5,712,216 | 1/1998 | Le-Khac et al. | 502/175 |
| 5,714,428 | 2/1998 | Le-Khac | 502/159 |
| 6,013,596 | * 1/2000 | Le-Khac et al. | 502/175 |

FOREIGN PATENT DOCUMENTS

| WO 98/16310 | 4/1998 | (WO) | B01J/27/06 |

\* cited by examiner

*Primary Examiner*—Rosalynd Keys
(74) *Attorney, Agent, or Firm*—Joseph C. Gil; N. Denise Brown; Carolyn M. Sloane

(57) ABSTRACT

The present invention relates to highly active, substantially crystalline double metal cyanide (DMC) catalysts, a process for the preparation of these double metal cyanide catalysts, a process for producing polyether polyols by the polyaddition of alcohol ethers onto starter compounds containing active hydrogen atoms from these DMC catalysts, and to the polyether polyols produced by this process. The DMC catalysts of the invention comprise a) double metal cyanide compounds, b) organic complexing ligands, and c) functionalized polymers. These catalysts exhibit increased activity in the process for the production of polyether polyols.

23 Claims, 1 Drawing Sheet

CRYSTALLINE DOUBLE METAL CYANIDE CATALYSTS FOR PRODUCING POLYETHER POLYOLS

Figure 1:
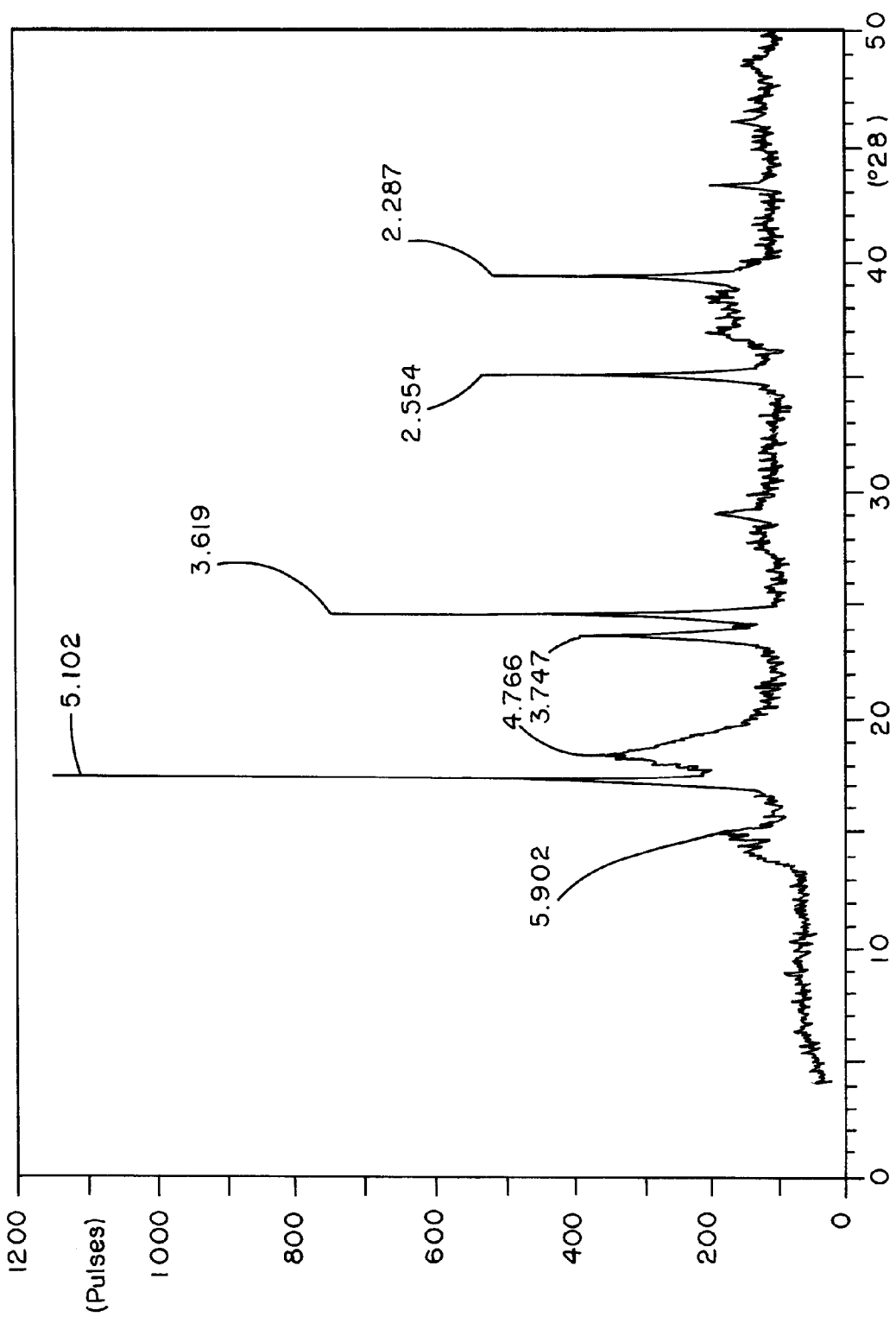

This application is a 371 of PCT/EP98/06312 filed Oct. 5, 1998.

The present invention relates to highly active, substantially crystalline double metal cyanide (DMC) catalysts for the production of polyether polyols by polyaddition of alkaline oxides to starter compounds containing active hydrogen atoms.

Double metal cyanide (DMC) catalysts for the polyaddition of alkaline oxides to starter compounds containing active hydrogen atoms are known (see for example U.S. Pat. Nos. 3,404,109, 3,829,505, 3,941,849, and 5,158,922). The use of these DMC catalysts for producing polyether polyols achieves in particular a reduction in the proportion of monofunctional polyethers with terminal double bonds, so-called monools, compared to the conventional production of polyether polyols by means of alkali metal catalysts such as alkali metal hydroxides. The resultant polyether polyols may be processed into high-grade polyurethanes (for example elastomers, foams, coatings). DMC catalysts are normally obtained by reacting an aqueous solution of a metal salt with the aqueous solution of a metal cyanide salt in the presence of a low molecular weight complex ligand, for example an ether. In a typical catalyst preparation aqueous solutions of for example zinc chloride (in excess) and potassium hexacyanocobaltate are mixed and then dimethoxyethane (glyme) is added to the resultant suspension. After filtering and washing the catalyst with aqueous glyme solution an active catalyst of the general formula

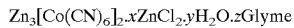
$$Zn_3[Co(CN)_6]_2 \cdot xZnCl_2 \cdot yH_2O \cdot zGlyme$$

is obtained (see for example EP 700 949).

From EP 700 949, WO 97/40086 and WO 98/16310 improved DMC catalysts are known that contain, in addition to the double metal cyanide compound and the organic complex ligand, also a polyether (EP 700 949, WO 97/40086) or a functionalised polymer and/or a water-soluble metal salt derived therefrom (WO 98/16310).

The improved DMC catalysts have an extremely high activity and enable polyether polyols to be produced at very low catalyst concentrations (20–25 ppm; see Table 1 in WO 98/16310).

The improved DMC catalysts described in EP 700 949, WO 97/40086 and WO 98/16310 are predominantly non-crystalline (i.e. amorphous). A decisive factor for the very high activity of these DMC catalysts is that the formation of highly crystalline forms of the catalyst is suppressed during the preparation (see p.11, lines 20–28 in WO 98/16310). As a result the X-ray diffraction diagram of the catalyst powder is characterised by the absence of sharp lines, characteristic of highly crystalline zinc hexacyanocobaltate, at for example 5.07, 3.56, 2.54 and 2.28 Å (see p.4 lines 25–26 in EP 700 949, p.8, lines 5–8 in WO 97/40086 and p.8, lines 26–29 in WO 98/16310). The X-ray diffraction diagrams of these catalysts on the other hand exhibit a single, relatively sharp peak at about 3.7–3.8 Å and two further, broader signals at about 4.7–4.9 Å and 5.8–6.2 Å (see p.4, lines 22–24 and Table 2 in EP 700 949, p.8, lines 1–5 in WO 97/40086 and p.10, lines 7–16 and FIG. 1 in WO 98/16310).

The object of the present invention was accordingly to provide improved DMC catalysts for the polyaddition of alkaline oxides to suitable starter compounds that have a significantly improved catalytic activity compared to the types of catalyst known hitherto. This leads, by reducing the reaction times of the polyether polyol production, to an improved economy of the process. Ideally the catalyst may as a result of its improved activity then be used in such low concentrations (20 ppm or less) that an otherwise very costly catalyst separation is no longer necessary, and the product can be used directly for polyurethane applications.

It has now surprisingly found that DMC catalysts that contain a double metal cyanide compound, an organic complex ligand and a functionalised polymer have a greatly increased activity in the production of polyether polyols if the DMC catalyst is substantially crystalline.

The present invention accordingly provides a highly active double metal cyanide (DMC) catalyst containing
  a) one or more, preferably one, double metal cyanide compound,
  b) one or more, preferably one, organic complex ligand different from c), and
  c) one or more, preferably one, functionalised polymer,
the catalyst being substantially crystalline.

The catalyst according to the invention may optionally contain d) water, preferably 1 to 10 wt. % and/or e) one or more water-soluble metal salts, preferably 5 to 25 wt. % of the formula $(I)M(X)_n$ from the preparation of the double metal cyanide compounds a).

In formula (I) M is selected from the metals Zn (II), Fe II), Ni (II), Mn (II), Co (II), Sn (II), Pb (II), Fe (III), Mo (IV), Mo (VI), Al (III), V (V), V (IV), Sr (II), W (IV), W (VI), Cu (II), and Cr (III). Particularly preferred are Zn (II), Fe (II), Co (II) and Ni (II). X are identical or different, preferably identical, and denote an anion, preferably selected from the group comprising halides, hydroxides, sulfates, carbonates, cyanates, thiocyanates, isocyanates, isothiocyanates, caroxylates, oxalates or nitrates. The value of n is 1, 2 or 3.

The double metal cyanide compounds a) contained in the catalysts according to the invention are the reaction products of water-soluble metal salts and water-soluble metal cyanide salts.

For the preparation of double metal cyanide compounds a) suitable water-soluble metal salts preferably have the general formula (I) $M(X)_n$, M being selected from the metals Zn (II) Fe II), Ni (II), Mn (II), Co (II), Sn (II), Pb (II), Fe (III), Mo (IV), Mo (VI), Al (III), V (V), V (IV), Sr (II), W (IV), W (VI), Cu (II), and Cr (III). Particularly preferred are Zn (II), Fe (II), Co (II) and Ni (II). X are identical or different, preferably identical, and denote an anion, preferably selected from the group comprising halides, hydroxides, sulfates, carbonates, cyanates, thiocyanates, isocyanates, isothiocyanates, caroxylates, oxalates or nitrates. The value of n is 1, 2 or 3.

Examples of suitable water-soluble metal salts are zinc chloride, zinc bromide, zinc acetate, zinc acetylacetonate, zinc benzoate, zinc nitrate, iron (II) sulfate, iron (II) bromide, iron (II) chloride, cobalt (I) chloride, cobalt (II) thiocyanate, nickel (II) chloride and nickel (II) nitrate. Mixtures of different water-soluble metal salts may also be used.

Suitable water-soluble metal cyanide salts for the preparation of double metal cyanide compounds a) preferably have the general formula $(II)(Y)_a M'(CN)_b (A)_c$, M' being selected from the metals Fe(II), Fe(III), Co(II), Co(III), Cr(II), Cr(III), Mn(II), Mn(III), Ir(III), Ni(II), Rh(III), Ru(II), V(IV) and V(V). Particularly preferably M' is selected from the metals Co(II), Co(III), Fe(II), Fe(III), Cr(II), Ir(III) and Ni(II). The water-soluble metal cyanide salt may contain one or more of these metals. Y are identical or different, preferably identical, and denote an alkali metal ion or an alkaline earth metal ion. A are identical or different, preferably identical, and denote an anion selected from the group comprising halides, hydroxides, sulfates, carbonates, cyanates, thiocyanates, isocyanates, isothiocyanates, carboxylates, oxalates or nitrates. a as well as b and c are integers, the values of a, b and c being chosen so as to ensure electrical neutrality of the metal cyanide salt; a is preferably 1, 2, 3 or 4; b is preferably 4, 5 or 6; c preferably has the value 0. Examples of suitable water-soluble metal cyanide salts are potassium hexacyanocobaltate (III), potassium hexacyanoferrate (II), potassium hexacyanoferrate (III), calcium hexacyanocobaltate (III) and lithium hexacyanocobaltate (III).

Preferred double metal cyanide compounds a) that are contained in the catalysts according to the invention are compounds of the general formula (III)

$$M_x[M'x_{,} (CN)_y]_z,$$

wherein M is defined as in Formula (I) and M' is defined as in Formula (II), and x, x', y and z are integers and are chosen so as to ensure the electrical neutrality of the double metal cyanide compound.
Preferably
 x=3, x'=1, y=6 and z=2
 M=Zn(II), Fe(II), Co(II) or Ni(II) and
 M'=Co(III), Fe(III), Cr(II) or Ir(III).

Examples of suitable double metal cyanide compounds a) are zinc hexacyanocobaltate (III), zinc hexacyanoiridate (III) zinc hexacyanoferrate (III) and cobalt (II) hexacyanocobaltate (III). Further examples of suitable double metal cyanide compounds are given for example in U.S. Pat. No. 5,158,922 (column 8, lines 29–66). Zinc hexacyanocobaltate (III) is particularly preferably used.

The organic complex ligands b) contained in the DMC catalysts according to the invention are known in principle and are described in detail in the prior art (see for example U.S. Pat. No. 5,158,922, in particular column 6, lines 9–65, U.S. Pat. Nos. 3,404,109, 3,829,505, 3,941,849, EP 700 949, WO 97/40086 and WO 98/16310). Preferred organic complex ligands are water-soluble, organic compounds with heteroatoms such as oxygen, nitrogen, phosphorus or sulphur that can form complexes with the double metal cyanide compound a). Suitable organic complex ligands are for example alcohols, aldehydes, ketones, ethers, esters, amides, ureas, nitriles, sulfides and their mixtures. Preferred organic complex ligands are water-soluble aliphatic alcohols such as ethanol, isopropanol, n-butanol, iso-butanol, sec.-butanol and tert.-butanol. Tert.-butanol is particularly preferred.

The organic complex ligand is added either during the preparation of the catalyst or immediately after the precipitation of the double metal cyanide compound a). The organic complex ligand is normally used in excess.

The DMC catalysts according to the invention contain the double metal cyanide compounds a) generally in amounts of 20–90 wt. %, preferably 25–80 wt. %, referred to the amount of the final catalyst, and contain the organic complex ligands b) generally in amounts of 0.5–30 wt. %, preferably 1–25 wt. %, referred to the amount of the final catalyst.

The DMC catalysts according to the invention normally contain 5–80 wt. %, preferably 7–60 wt. %, referred to the amount of the final catalyst, of functionalised polymer.

The term functionalised polymers is understood to mean polymers that contain one or more functional groups with heteroatoms such as oxygen, nitrogen, sulphur, phosphorus or halogen within the polymer.

Suitable functionalised polymers for the production of the catalysts according to the invention are known in principle and are described in detail in EP 700 949, WO 97/40086, WO 98/16310, German Patent Applications 197 45 120.9, 197 57 574.9, 198 10 269.0, 198 34 573.9 and 198 42 382.9. Suitable functionalised polymers are for example polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkylenimines, maleic acid co-polymers and maleic anhydride co-polymers, hydroxyethyl cellulose and polyacetals.

Functionalised polymers that are preferably used are polyethers, polyesters, polycarbonates, polyalkylene glycol sorbitan esters and polyalkylene glycol glycidyl ethers.

Polyethers that are preferably used are polyether polyols with hydroxy functionalities of 1 to 8, particularly preferably of 1 to 3, and number average molecular weights of between 150 and $10^7$, particularly preferably between 200 and $5 \cdot 10^4$. As a rule they are obtained by ring opening polymerisation of epoxides in the presence of appropriate starter compounds containing active hydrogen atoms under base, acid or co-ordinative catalysis, e.g. DMC catalysis. Suitable polyether polyols are for example poly (oxypropylene) polyols, poly(oxyethylene) polyols, EO-tipped poly(oxypropylene) polyols, mixed EO/PO polyols, butylene oxide polymers, butylene oxide co-polymers with ethylene oxide and/or propylene oxide, and poly(oxytetramethylene) glycols.

Polyesters that are preferably used are linear and partially branched polyesters having hydroxy terminal groups and with mean molecular weights below 10000, which are described in more detail in German Patent Application 197 45 120.9. Particularly preferably used are polyesters with mean molecular weights of 400 to 6000 and OH numbers of 28 to 300 mg KOH/g, which are suitable for the production of polyurethanes. Suitable polyesters are for example poly (ethylene glycol adipate), poly(diethylene glycol adipate), poly(dipropylene glycol adipate), and poly(diethylene glycol adipate) or poly(tetramethylene glycol adipate) branched with trimethylolpropane.

Polycarbonates that are preferably used are aliphatic polycarbonates with hydroxy terminal groups and with mean molecular weights below 12000, which are described in more detail in German Patent Application 197 57 574.9. Aliphatic polycarbonate diols with mean molecular weights of 400 to 6000 are particularly preferably used. Suitable polycarbonate diols are for example poly(1,6-hexanediol) carbonate, poly(diethylene glycol) carbonate, poly (dipropylene glycol) carbonate, poly(triethylene glycol) carbonate, poly(1,4-bishydroxymethylcyclohexane) carbonate, poly(1,4-butanediol) carbonate or poly (tripropylene glycol) carbonate.

Polyalkylene glycol sorbitan esters that are preferably used are polyethylene glycol sorbitan esters (polysorbates), which are described in more detail in German Patent Application 198 42 382.9. Particularly preferred are polyethylene glycol sorbitan monoesters, diesters and triesters of fatty acids with 6 to 18 C atoms and 2 to 40 moles of ethylene oxide.

Polyalkylene glycol glycidyl ethers that are preferably used are monoglycidyl and diglycidyl ethers of polypropylene glycol and polyethylene glycol, which are described in more detail in Gennan Patent Application 198 34 573.9.

Arbitrary mixtures of the aforementioned functionalised polymers may also be used.

The analysis of the catalyst composition is normally carried out by means of elementary analysis, thermogravimetry or extractive removal of the functionalised polymer fraction followed by gravimetric determination.

The analysis of the crystallinity of the substantially crystalline catalysts according to the invention is carried out by powder X-ray diffractometry. The term "substantially crystalline" means that the X-ray diffraction diagrams of the catalyst powder exhibit sharp lines characteristic of highly crystalline double metal cyanide compounds, one of these lines being the most intense line in the X-ray diffraction diagram.

In DMC catalysts according to the invention that contain zinc hexacyanocobaltate (III) as double metal cyanide compound, the X-ray diffraction diagram of the catalyst powder is characterised by the appearance of sharp lines characteristic of highly crystalline zinc hexacyanocobaltate at d distances of about 5.05 to 5.15 Å, 3.55 to 3.65 Å, 2.50 to 2.60 Å and 2.25 to 2.30 Å. It is also characteristic of these DMC catalysts that the line at about 5.05–5.15 Å is always present as the most intense signal in the X-ray diffraction diagram (see for example FIG. 1 (X-ray diffraction diagram of catalyst A from Example 1): lines at 5.10, 3.62, 2.55 and 2.29 Å). Lines characteristic of amorphous DMC catalysts may also occur in the diffraction diagrams at about 3.7–3.8 Å (relatively sharp) as well as the two broad signals at about 4.7–4.9 Å and 5.8–6.2 Å, though with a lesser intensity.

Preferred are catalysts according to the invention that contain a) zinc hexacyanocobaltate (III),
b) tert.-butanol and
a functionalised polymer,
the catalyst being substantially crystalline.

The preparation of the DMC catalysts according to the invention is normally carried out in aqueous solution by reacting a) metal salts, in particular of the formula (I), with metal cyanide salts, in particular of the formula (II), β) organic complex ligands b) that are different from the functionalised polymer, and γ) the functionalised polymer.

In this connection the aqueous solutions of the metal salt (e.g. zinc chloride used in stoichiometric excess (at least 50 mole % referred to the metal cyanide salt)) and of the metal cyanide salt (e.g. potassium hexacyanocobaltate) are first of all reacted in the presence of the organic complex ligand b) (for example tert.-butanol), a suspension being formed that contains the double metal cyanide compound a) (e.g. zinc hexacyanocobaltate), water d), excess metal salt e), and the organic complex ligand b).

The organic complex ligand b) may be present in the aqueous solution of the metal salt and/or of the metal cyanide salt, or it may be added directly to the suspension obtained after precipitation of the double metal cyanide compound a). It has been found advantageous to mix the aqueous solutions and the organic complex ligand b) while stirring vigorously. The resultant suspension is normally then treated with the funactionalised polymer c). The functionalised polymer c) is preferably used in a mixture with water and organic complex ligand b).

The catalyst is then removed from the suspension by known techniques such as centrifugation or filtration. In a preferred embodiment the separated catalyst is then washed with an aqueous solution of the organic complex ligand b) (for example by resuspension followed by renewed separation by filtration or centrifugation). In this way water-soluble byproducts such as for example potassium chloride may be removed from the catalyst according to the invention.

Preferably the amount of organic complex ligand b) in the aqueous wash solution is between 40 and 80 wt. % referred to the total solution. It is also advantageous to add to the aqueous wash solution some functionalised polymer, preferably in an amount between 0.5 and 5 wt. % referred to the total solution.

It is furthermore advantageous to wash the catalyst more than once. To this end the first wash process may for example be repeated. However, it is preferred not to use aqueous solutions for further wash processes, but to use for example a mixture of organic complex ligand and functionalised polymer.

The washed catalyst is then dried, optionally after grinding, at temperatures of in general 20°–100° C. and at pressures of in general 0.1 mbar to normal pressure (1013 mbar).

A further subject of the invention is the use of the substantially crystalline DMC catalysts according to the invention for the production of polyether polyols by polyaddition of alkylene oxides to starter compounds containing active hydrogen atoms.

As alkylene oxides there may preferably be used ethylene oxide, propylene oxide, butylene oxide as well as their mixtures. The build-up of the polyether chains by alkoxylation may for example be carried out with only one monomeric epoxide, but may also be effected statistically or blockwise with two or three different monomeric epoxides. Further details are given in "Ullmanns Encyclopädie der industriellen Chemie", English-language Edition 1992, Vol. A21, pp 670–671.

As starter compounds containing active hydrogen atoms compounds are used with molecular weights of 18 to 2000 and with 1 to 8 hydroxyl groups. Examples that may be mentioned include ethylene glycol, diethylene glycol, triethylene glycol, 1,2-propylene glycol, 1,4-butanediol, hexamethylene glycol, bisphenol A, trimethylolpropane, glycerol, pentaerythritol, sorbitol, cane sugar, degraded starch and water.

Preferably starter compounds containing active hydrogen atoms are used that have been prepared for example by conventional alkali catalysis from the aforementioned low molecular weight starters and that constitute oligomeric alkoxylation products with molecular weights from 200 to 2000.

The polyaddition of alkylene oxides to starter compounds containing active hydrogen atoms that is catalysed by the catalysts according to the invention is generally carried out at temperatures from 20 to 200° C., preferably in the range from 40 to 180° C., particularly preferably at temperatures from 50 to 150° C. The reaction may be carried out at total pressures ranging from 0 to 20 bar. The polyaddition may be carried out in bulk or in an inert, organic solvent such as toluene and/or THF. The amount of solvent is normally 10 to 30 wt. % referred to the amount of the polyether polyol to be produced.

The catalyst concentration is chosen so as to ensure, under the given reaction conditions, a good control of the polyaddition reaction. The catalyst concentration is generally in the range from 0.0005 wt. % to 1 wt. %, preferably in the range from 0.001 wt. % to 0.1 wt. %, and particularly preferably in the range from 0.001 wt. % to 0.0025 wt. %, referred to the amount of polyether polyol to be produced.

The molecular weights of the polyether polyols produced by the process according to the invention are in the range from 500 to 100000 g/mole, preferably in the range from 1000 to 50000 g/mole, and particularly preferably in the range from 2000 to 20000 g/mole.

The polyaddition may be carried out continuously or batchwise, for example in a batch or in a semibatch process.

On account of their significantly enhanced activity the catalysts according to the invention may be used in very low concentrations (20 ppm and less, referred to the amount of polyether polyol to be produced). If the polyether polyols produced in the presence of the catalysts according to the invention are used for the production of polyurethanes (Kunststoffhandbuch, Vol. 7, Polyurethanes, 3$^{rd}$ Edition, 1993, polyether polyols. pp.25–32 and 57–67), a removal of the catalyst from the polyether polyol may be omitted without adversely affecting the product qualities of the resultant polyurethane.

The following examples illustrate the invention without however restricting the latter in any way.

EXAMPLES

Catalyst Preparation

Example 1

Preparation of a substantially crystalline DMC catalyst with tert.-butanol as organic complex ligand and use of a polyester (catalyst A).

A solution of 12.5 g (91.5 mMole) of zinc chloride in 20 ml of distilled water is added while stirring vigorously (24000 revs./min) to a solution of 4 g (12 mMole) of potassium hexacyanocobaltate in 70 ml of distilled water. Immediately following this a mixture of 50 g of tert.-butanol and 50 g of distilled water is added to the resultant suspension and the whole is then stirred vigorously for 10 minutes (24000 revs./min). A mixture of 1 g of a polyester of adipic acid and diethylene glycol with a mean molecular weight of 2300 (OH number=50 mg KOH/g) that has been weakly branched by trimethylolpropane, 1 g of tert.-butanol and 100 g of distilled water is then added and the whole is stirred for 3 minutes (1000 revs./min). The solids are separated by filtration, then stirred for 10 minutes (10000 revs./min) with a mixture of 70 g of tert.-butanol, 30 g of distilled water and 1 g of the above polyester, and refiltered. Stirring with a mixture of 100 g of tert.-butanol and 0.5 g of the above polyester (10000 revs./min) is then repeated for 10 minutes. After filtration the catalyst is dried at 50° C. and under normal pressure to constant weight.

Yield of dried, pulverulent catalyst: 3.85 g

Elementary analysis and thermogravimetric analysis: cobalt=12.2%, zinc=25.7%, tert.-butanol=7.1%, polyester=12.3%

The X-ray diffraction diagram of catalyst A is shown in FIG. 1.

The signals appearing in the X-ray diffraction diagram of catalyst A are summarised in Table 1.

Example 2

Preparation of a substantially crystalline DMC catalyst with tert.-butanol as organic complex ligand and use of a polycarbonate (catalyst B).

A solution of 12.5 g (91.5 mMole) of zinc chloride in 20 ml of distilled water is added while stirring vigorously (24000 revs./min) to a solution of 4 g (12 mMole) of potassium hexacyanocobaltate in 70 ml of distilled water. Immediately thereafter a mixture of 50 g of tert.-butanol and 50 g of distilled water is added to the resultant suspension and the whole is then stirred vigorously for 10 minutes (24000 revs./min). A mixture of 1 g of a dipropylene glycol polycarbonate with a mean molecular weight of 1968 (determined by measuring the OH number), 1 g of tert.-butanol and 100 g of distilled water is then added and the whole is stirred for 3 minutes (1000 revs./min). The solids are removed by filtration, then stirred for 10 minutes (10000 revs./min) with a mixture of 70 g of tert.-butanol, 30 g of distilled water and 1 g of the above polycarbonate, and refiltered. Stirring with a mixture of 100 g of tert.-butanol and 0.5 g of the above polycarbonate is then repeated for 10 minutes (10000 revs./min). After filtration the catalyst is dried at 50° C. and under normal pressure to constant weight.

Yield of dried, pulverulent catalyst: 5.33 g

Elementary analysis and thermogravimetric analysis: cobalt=10.8%, zinc=24.4%, tert.-butanol=20.2%, polycarbonate=15.0%

The signals appearing in the X-ray diffraction diagram of catalyst B are summarised in Table 1.

Example 3

Preparation of a substantially crystalline DMC catalyst with tert.-butanol as organic complex ligand and use of a polyether (catalyst C).

A solution of 12.5 g (91.5 mMole) of zinc chloride in 20 ml of distilled water is added while stirring vigorously (24000 revs./min) to a solution of 4 g (12 mMole) of potassium hexacyanocobaltate in 70 ml of distilled water. Immediately thereafter a mixture of 50 g of tert.butanol and 50 g of distilled water is added to the resultant suspension and the whole is then stirred vigorously for 10 minutes (24000 revs./min). A mixture of 1 g of a poly(oxyethylene) diol with a mean molecular weight of 2000, 1 g of tert.-butanol and 100 g of distilled water is then added and the whole is stirred for 3 minutes (1000 revs./min). The solids are removed by filtration, then stirred for 10 minutes (10000 revs./min) with a mixture of 70 g of tert.-butanol, 30 g of distilled water and 1 g of the above poly(oxyethylene) diol, and refiltered. Finally, stirring with a mixture of 100 g of tert.-butanol and 0.5 g of the above poly(oxyethylene) diol is repeated for 10 minutes (10000 revs./min). After filtration the catalyst is dried at 50° C. and under normal pressure to constant weight.

Yield of dried, pulverulent catalyst: 5.97 g

Elementary analysis and thermogravimetric analysis: cobalt=10.0%, zinc=22.0%, tert.-butanol=4.2%, polyether=41.1%

The signals appearing in the X-ray diffraction diagram of catalyst C are summarised in Table 1.

Example 4

Preparation of a substantially crystalline DMC catalyst with tert.-butanol as organic complex ligand and use of a polyalkylene glycol glycidyl ether (catalyst D).

A solution of 12.5 g (91.5 mMole) of zinc chloride in 20 ml of distilled water is added while stirring vigorously (24000 revs./min) to a solution of 4 g (12 mMole) of potassium hexacyanocobaltate in 70 ml of distilled water. Immediately thereafter a mixture of 50 g of tert.-butanol and 50 g of distilled water is added to the resultant suspension and the whole is then stirred vigorously (24000 revs./min) for 10 minutes. A mixture of 1 g of a polypropylene glycol-bis-2,3-epoxypropyl ether) with a number average molecular weight of 640 (Aldrich Company), 1 g of tert.-butanol and 100 g of distilled water is then added and the whole is stirred for 3 minutes (1000 revs./min). The solids are removed by filtration, then stirred for 10 minutes (10000 revs./min) with a mixture of 70 g of tert.-butanol, 30 g of distilled water and 1 g of the above polypropylene glycol-bis-(2,3-epoxypropyl ether), and refiltered. Finally, stirring with a mixture of 100 g of tert.-butanol and 0.5 g of the above polypropylene glycol-bis-(2,3-epoxypropyl ether) is then repeated for 10 minutes (10000 revs./min). After filtration the catalyst is dried at 50° C. and under normal pressure to constant weight.

Yield of dried, pulverulent catalyst: 8.70 g

Elementary analysis, thermogravimetric analysis and extraction: cobalt=8.7%, zinc=20.2%, tert.-butanol=4.2%, polyalkylene glycol glycidyl ether ligand=30.5%

The signals appearing in the X-ray diffraction diagram of catalyst D are summarised in Table 1.

Preparation of Polyether Polyols
General Procedure 50 g of polypropylene glycol starter (molecular weight=1000 g/mole) and 3 mg of catalyst (15 ppm, referred to the amount of polyether polyol to be prepared) are placed under a protective gas (argon) in a 500 ml pressurised reactor and are heated to 105° C. while stirring. Propylene oxide (ca. 5 g) is then added in one go until the total pressure has risen to 2.5 bar. Further propylene oxide is added only after an accelerated pressure drop has been observed in the reactor. This accelerated pressure drop indicates that the catalyst is activated (end of induction period). The remaining propylene oxide (145 g) is then added continuously at a constant overall pressure of 2.5 bar. After completing the propylene oxide addition and after two hours' post-reaction at 105° C. volatile constituents are distilled off at 90° C. (1 mbar) and then cooled to room temperature.

The resultant polyether polyols were characterised by determining the OH numbers, the double bond contents, and the viscosities.

The course of the reaction was followed by means of time-conversion curves (propylene oxide consumption [g] vs. reaction time (min.)). The induction time was determined from the point of intersection of the tangent to the steepest point of the time-conversion curve with the extended baseline of the time-conversion curve. The important propoxylation times for the catalyst activity correspond to the interval between the catalyst activation (end of the induction time) and the end of the propylene oxide addition.

Example 5

| Preparation of polyether polyol with catalyst A (15 ppm). | |
|---|---|
| Induction time: | 80 min. |
| Propoxylation time: | 155 min. |
| Overall reaction time: | 335 min. |
| Polyether polyol: | |
| OH number (mg K~OH/g): | 27.4 |
| Double bond content (mMole/kg): | 5 |
| Viscosity at 25° C. (mPas): | 1084 |

Example 6

| Preparation of polyether polyol with catalyst B (15 ppm) | |
|---|---|
| Induction time: | 120 min. |
| Propoxylation time: | 190 min. |
| Overall reaction time: | 310 min. |
| Polyether polyol: | |
| OH number (mg KOH/g): | 29.6 |
| Double bond content (mMole/kg): | 6 |
| Viscosity at 25° C. (mPas): | 901 |

Example 7

| Preparation of polyether polyol with catalyst C (15 ppm) | |
|---|---|
| Induction time: | 150 min. |
| Propoxylation time: | 245 min. |
| Overall reaction time: | 395 min. |
| Polyether polyol: | |
| OH number (mg KOH/g): | 29.8 |
| Double bond content (mMole/kg): | 11 |
| Viscosity at 25° C. (mPas): | 935 |

Example 8

| Preparation of polyether polyol with catalyst D (15 ppm) | |
|---|---|
| Induction time: | 295 min. |
| Propoxylation time: | 160 min. |
| Overall reaction time: | 455 min. |
| Polyether polyol: | |
| OH number (mg KOH/g): | 30.0 |
| Double bond content (mMole/kg): | 7 |
| Viscosity at 25° C. (mPas): | 897 |

Examples 5–8 show that the substantially crystalline DMC catalysts according to the invention may on account of their extremely high activity be used in such low concentrations in the preparation of the polyether polyol that a separation of the catalysts from the polyol may be omitted.

It can be seen from Table 1 that sharp lines characteristic of highly crystalline zinc hexacyanocobaltate appear in the X-ray diffraction diagrams of the catalysts according to the invention at d distances of 5.05–5.15 Å, 3.55–3.65 Å, 2.50–2.60 Å and 2.25–2.30 Å, and that the signal at 5.05–5.15 Å always occurs as the most intense signal.

FIG. 1 shows by way of illustration the X-ray diffraction diagram of the catalyst A from Example 1: sharp lines characteristic of highly crystalline zinc hexacyanocobaltate occur at d distances of 5.10, 3.62, 2.55 and 2.29 Å. The most intense signal is the line at 5.10 Å.

TABLE 1

Characterisation of the DMC catalysts by X-ray diffraction.

| | X-Ray Diffraction Diagram d Distances/[Å] | | | | | | |
|---|---|---|---|---|---|---|---|
| | 5.6–6.2 (br) | 5.05–5.15 (s) | 4.6–4.9 (br) | 3.7–3.8 | 3.55–3.65 (s) | 2.5–2.6 (s) | 2.25–2.3 (s) |
| 1 (Cat. A) | + | +[1'] | + | + | + | + | + |
| 1 (Cat. B) | + | +[1'] | + | + | + | + | + |
| 3 (Cat. C) | + | +[1'] | + | + | + | + | + |
| 4 (Cat. D) | + | +[1'] | + | + | + | + | + |

(br) = broad band, (s) = sharp signal
[1']most intense signal

What is claimed is:

1. A double metal cyanide (DMC) catalyst comprising
   a) one or more double metal cyanide compounds,
   b) one or more organic complex ligands different from c), and
   c) one or more functionalized polymers,
wherein the resultant catalyst is substantially crystalline.

2. The DMC catalyst according to claim 1, additionally comprising
   d) water, and/or
   e) one or more water-soluble metal salts.

3. The DMC catalyst according to claim 1, wherein the double metal cyanide compound comprises zinc hexacyanocobaltate (III).

4. The DMC catalyst according to claim 1, wherein the organic complex ligand comprises tert.-butanol.

5. The DMC catalyst according to claim 1, wherein the catalyst contains 5 to 80 wt. % of a functionalized polymer.

6. A DMC catalyst comprising
   a) zinc hexacyanocobaltate (III),
   b) tert.-butanol, and
   c) a functionalized polymer,
wherein the resultant catalyst is substantially crystalline.

7. The DMC catalyst according to claim 1, wherein highly crystalline double metal cyanide compounds present in the catalyst powder generate sharp lines in an X-ray diffraction diagram.

8. The DMC catalyst according to claim 6, wherein in an X-ray diffraction diagram for highly crystalline zinc hexacyanocobaltate, characteristic lines are generated at d distances of about 5.05–5.15 Å, 3.55–3.65 Å, 2.50–2.60 Å and 2.25–2.30 Å.

9. The DMC catalyst according to claim 8, in wherein the peak at a d distance of about 5.05–5.15 Å in the X-ray diffraction diagram is the most intense signal.

10. The DMC catalyst according to claim 1, wherein the functionalized polymer is selected from the group consisting of polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkylenimines, maleic acid and maleic anhydride co-polymers, hydroxyethyl cellulose and polyacetals.

11. The DMC catalyst according to claim 10, wherein the functionalized polymer comprises a polyether.

12. The DMC catalyst according to claim 11, wherein the polyether is a polyether polyol with a hydroxy functionality of 1 to 3 and a number average molecular weight of between 200 and $5 \cdot 10^4$.

13. The DMC catalyst according to claim 10, wherein the functionalized polymer comprises a polycarbonate.

14. The DMC catalyst according to claim 13, wherein the functionalized polymer comprises an aliphatic polycarbonate diol with a mean molecular weight of 400 to 6000.

15. The DMC catalyst according to claim 10, wherein the functionalized polymer comprises a polyester.

16. The DMC catalyst according to claim 15, wherein the functionalized polymer comprises a polyester with a mean molecular weight of 400 to 6000 and OH number of 28 to 300 mg KOH/g.

17. The DMC catalyst according to claim 10, wherein the functionalized polymer comprises a polyalkylene glycol sorbitan ester.

18. The DMC catalyst according to claim 10, wherein the functionalized polymer comprises a polyethylene glycol sorbitan monoester, diester, or triester of a fatty acid having 6 to 18 carbon atoms and 2 to 40 moles of ethylene oxide.

19. The DMC catalyst according to claim 10, wherein the functionalized polymer comprises a polyalkylene glycol glycidyl ether.

20. The DMC catalyst according to claim 10, wherein the functionalized polymer comprises a monoglycidyl ether or a diglycidyl ether of polypropylene glycol or polyethylene glycol.

21. A process for preparing the DMC catalyst according to claim 1, comprising:
   i) reacting, in aqueous solution,
      (α) one or more metal salts, with one or more metal cyanide salts, in the presence of
      (β) organic complex ligands that are different from the functionalized polymer, and
      (γ) functionalized polymer,
   thereby forming a suspension comprising a double metal cyanide catalyst;
   ii) separating the catalyst from the suspension, washing the catalyst, and
   iii) drying the catalyst.

22. In a process for producing polyether polyols by the polyaddition of alkylene oxides to starter compounds containing active hydrogen atoms in the presence of a catalyst, the improvement wherein the catalyst comprises the DMC catalysts according to claim 1.

23. The DMC catalyst according to claim 5, wherein said functionalized polymer is present in an amount of from 7 to 60% by weight.

* * * * *